United States Patent
Roming (10) Patent No.: US 8,091,831 B2
(45) Date of Patent: Jan. 10, 2012

(54) AIRCRAFT WITH DOOR SEAL ARRANGEMENT

(75) Inventor: Thorsten Roming, Himmelpforten (DE)

(73) Assignee: Airbus Deutschland GmbH, Hamburg (DE)

( * ) Notice: Subject to any disclaimer, the term of this patent is extended or adjusted under 35 U.S.C. 154(b) by 549 days.

(21) Appl. No.: 11/998,129

(22) Filed: Nov. 28, 2007

(65) Prior Publication Data

US 2008/0164373 A1    Jul. 10, 2008

Related U.S. Application Data (60) Provisional application No. 60/861,383, filed on Nov. 28, 2006.

(51) Int. Cl.
*B64C 1/14*    (2006.01)

(52) U.S. Cl. .................. 244/129.5; 244/129.4; 49/484.1; 49/477.1; 49/475.1; 277/630

(58) Field of Classification Search .............. 244/129.4, 244/129.5; 49/484.1, 477.1, 483.1, 475.1; 277/630, 637, 645, 646, 649, 921
See application file for complete search history.

(56) References Cited

U.S. PATENT DOCUMENTS

| 1,761,550 | A | | 6/1930 | Wahl | |
|---|---|---|---|---|---|
| 3,791,075 | A | * | 2/1974 | Blickman | 49/484.1 |
| 3,831,950 | A | * | 8/1974 | Bentley et al. | 277/649 |
| 4,337,956 | A | * | 7/1982 | Hopper | 277/552 |
| 5,667,169 | A | * | 9/1997 | Erben et al. | 244/129.5 |

FOREIGN PATENT DOCUMENTS

| FR | 1394086 | * | 1/1964 |
|---|---|---|---|
| FR | 2730809 | * | 8/1996 |

* cited by examiner

*Primary Examiner* — Joshua Michener
(74) *Attorney, Agent, or Firm* — Greer, Burns & Crain, Ltd.

(57) ABSTRACT

A door arrangement for tightly closing a door opening comprises a door frame, a door which, when closed, is arranged in the door frame, and inner and outer sealing lips. The inner and outer sealing lips run next to each other along a periphery of the door opening between a first surface of the door and a second surface of the door frame, wherein the first and second surfaces face each other. The inner and outer sealing lips bound a space formed between them. The door arrangement further comprises a pressure-reducing device configured to reduce pressure in the space.

11 Claims, 6 Drawing Sheets

AIRCRAFT WITH DOOR SEAL ARRANGEMENT

CROSS-REFERENCE TO RELATED APPLICATION

This application claims the benefit of U.S. Provisional Application No. 60/861,383, filed Nov. 28, 2006, the entire disclosure of which is herein incorporated by reference.

BACKGROUND OF THE INVENTION

The present invention relates to an aircraft with a door arrangement for tightly closing a door opening.

Although applicable to any desired door arrangements, the present invention and the problem on which it is based are explained in more detail with reference to an aircraft passenger or freight door arrangement.

In order to load and unload an aircraft and in order for passengers and crew to get in and out, one or more openings are formed, usually in the aircraft fuselage, which openings can be closed by differently constructed door arrangements comprising doors and door frames. To close them, a respective door is positioned in a form-fitting manner within an associated door frame and locked mechanically. The door arrangements are to be able to be opened rapidly and simply but are to be tightly closed during the flight and should reliably absorb all of the loads which occur.

In particular in aircraft, which are equipped with a pressurized cabin, a door arrangement has to withstand the difference in pressure between an internal pressure, which is kept constant, within the pressurized cabin and a considerably lower external pressure at cruising altitude. For this purpose, seals are usually used between the door and door frame in order to prevent air from escaping from the pressurized cabin into the atmosphere through remaining gap openings between door and door frame.

Figure 3:
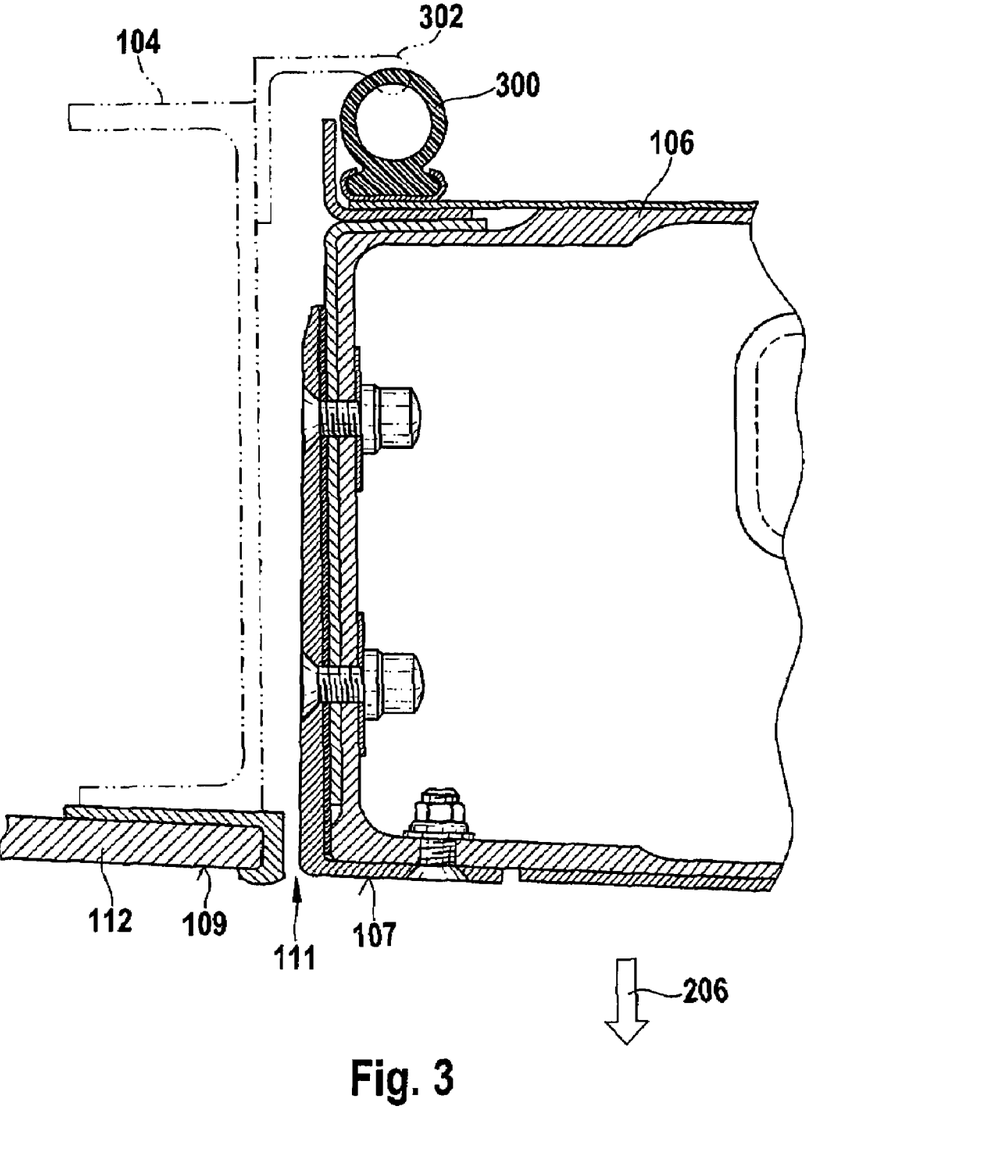
FIG. 3 is a sectional view of an edge region of a conventional vehicle door.

FIG. 3 shows an example of a conventionel door arrangement of an aircraft with a seal of this type. Part of an aircraft fuselage skin 112 is illustrated in sectional view, in the vicinity of the edge of a fuselage opening with a door arrangement which comprises an aircraft door 106 and a door frame 104 connected fixedly to the skin 112. In the closed state shown, the door 106 is positioned in a form-fitting manner in the door frame 104 and is locked to the door frame 104 via a mechanical closing mechanism. For orientation purposes, the opening direction of the door 106 is marked by an arrow 206.

In the shown, closed state of the door arrangement, the outer surface 107 of the door 106 and the surface 109 of the skin are aligned with each other, they being spaced apart from each other via a gap 111. A sealing lip 300 is fastened to the inner surface of the door 106, said sealing lip being composed of a rubber-elastic material which, in the shown, closed state, is pressed against an opposite stop 302 of the door frame 104 by an application or locking force exerted by the mechanical locking. In the process, the rubber-elastic sealing lip 300 is deformed in order to match the shape of the stop 302. In order to show its elasticity, the sealing lip 300 is illustrated in a relaxed state, with its contours being overlapped in the illustration by the contours of the stop 302.

In the case of the conventionel door arrangement, an improvement in the sealing quality is desirable in order to completely withstand the pressure differences occurring during the flight, in particular at high flight altitudes, and to prevent air from the pressurized cabin of the aircraft from flowing past the seal into the outside atmosphere. However, a reinforcement of the mechanical locking in order to increase and uniformly distribute the application force, with which the sealing lip is pressed against a mating sealing surface such as the stop shown in FIG. 3, with the aim of improving the quality of the seal, would result in a substantial increase in the weight of the door arrangement.

SUMMARY

It is an object of the present invention to improve the quality of the sealing of a door arrangement without substantially increasing the weight of the door arrangement.

The object is achieved in accordance with the invention by means of a door arrangement for tightly closing a door opening, comprising a door frame and a door which, in the closed state, is arranged in the door frame. An inner sealing lip and an outer sealing lip run next to each other along a periphery of the door opening between a surface of the door and an opposite mating surface of the door frame. The sealing lips bound an intermediate space formed between them. The door arrangement furthermore comprises a pressure-reducing device for reducing a pressure in the intermediate space.

The idea on which the present invention is based is that, in the closed state, two sealing lips bound a peripheral intermediate space between the door frame and the door, the internal pressure of which intermediate space can be reduced by means of the pressure-reducing device. In particular, the internal pressure is reduced in such a manner that, for example when the door arrangement is used in an aircraft, it is lower than a cabin pressure and an external or ambient pressure, which pressures each bear against sealing lip sections facing away from the intermediate space. This results in a suction force between the door surface and the mating surface of the door frame as boundary surfaces of the intermediate space, which suction force is based on the higher pressure in the two regions which are separated from each other by the door arrangement, in a manner similar to the principle of action of Otto von Guerick's Magdeburg hemispheres. Since the sealing lips run between the door surface and the mating surface of the door frame, they are subjected to an application force which is increased by the amount of suction force, as a result of which their sealing action is improved.

Owing to the fact that the suction force acts directly on the location at which it is produced, force-transmitting structures, such as mechanical reinforcements or stiffenings which could increase the weight of the door arrangement, are not required.

A press-on or securing device may be provided for pressing the surface of the door against the mating surface of the door frame or for securing the door, when closed, in the door frame. For example, this can be a customary mechanical locking or closure system which is present in addition to the features of the present invention and interacts with them. This may have the advantage that sealing of the intermediate space can be achieved even if there are slight inaccuracies in the matching shape of the surface of the door, on the one hand, and of the mating surface of the door frame, on the other hand, when the door arrangement is closed, which in turn makes it possible to further improve the sealing quality by the use of the pressure-reducing device.

The pressure-reducing device may comprise a vacuum pump by means of which the intermediate space can be evacuated. For example, the vacuum pump is driven electrically, and it can therefore be fed with power from the on-board supply system. Such a vacuum pump can be arranged, for example, in the immediate vicinity of the frame within the wall panel, or else in a space-saving manner within the door. The pressure-reducing device preferably contains at least one channel in the surface of the door and/or the mating surface of the door frame, which channel opens into the intermediate space and through which the vacuum pump pumps off the air. The channel can be positioned as desired on the periphery of the door opening, and therefore the channel can be arranged in the immediate vicinity of the vacuum pump and only an extremely short connecting line is required between the vacuum pump and an entry opening to the channel.

The inner and/or the outer sealing lip may have a rubber material. Such a material is capable, by means of its elasticity, of compensating for unevennesses and application forces which are not distributed homogeneously. The rubber material may, for instance, be a highly tear-resistant silicone rubber material.

The inner and/or the outer sealing lip may have a hollow cross section. Such a profile can be adapted particularly readily to unevenesses, since it can be deformed flexibly over a wide range.

The inner and/or outer sealing lip may have a solid cross section. In comparison to a hollow profile, a solid profile has the advantage that forces acting sideways in the direction of the centre of the intermediate space can be better absorbed or intercepted.

The inner and outer sealing lip may be connected integrally to each other. This permits particularly simple production and installation of the sealing lips.

In addition, forces acting sideways in the direction of the center of the intermediate space can be particularly readily absorbed.

The surface of the door and the mating surface of the door frame may run essentially parallel and perpendicular to an opening direction of the door. In this arrangement, the suction force which is produced by reduction in the pressure in the intermediate space and which draws the surface of the door and the mating surface of the door frame against each other acts counter to the opening direction of the door. This has the advantage that the suction force directly contributes to keeping the door closed, and relieves the load on further closure systems which may be present.

The inner and/or outer sealing lip may be fastened to the surface of the door or the mating surface of the door frame. In this case, a stop is formed on a surface section lying opposite the respective sealing lip, against which the sealing lip is pressed in each case in the closed state. The sealing lip, which is elastically deformed as a result, nestles against the contour of the stop. The stop which is pressed against the sealing lip in the closed state preferably makes contact with the sealing lip essentially with a surface section which, in relation to the surface to which the sealing lip is fastened, is inclined in a direction pointing away from the intermediate space. This has the advantage that a pressing force which, during the evacuation of the intermediate space, presses on the sealing lip itself and loads it in the direction of the intermediate space is used for increased pressing of the sealing lip against the inclined surface section. This improves the sealing action of the sealing lip.

BRIEF DESCRIPTION OF THE DRAWINGS

The invention is explained in more detail below using exemplary embodiments and with reference to the attached figures of the drawing, in which.

DETAILED DESCRIPTION OF THE INVENTION

In the figures, the same reference numbers refer to identical or functionally identical components unless stated otherwise.

Figure 1:
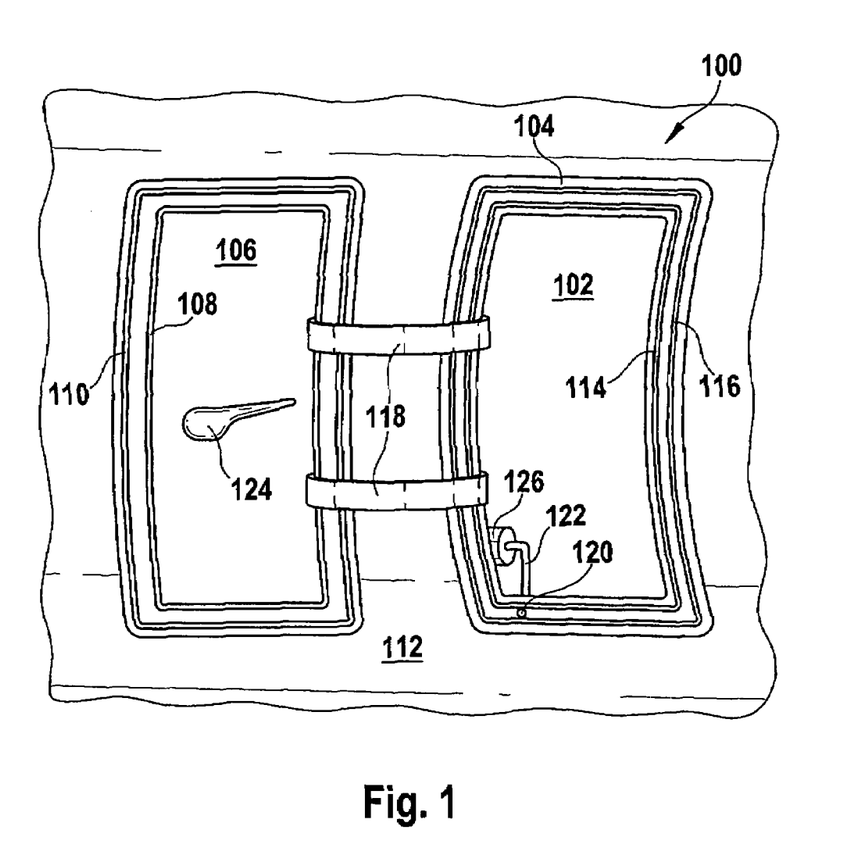
FIG. 1 is a cutout of an outside view of an aircraft fuselage with a door arrangement, in an open state.

FIG. 1 shows, in a perspective illustration, a cutout of the skin 112 of an aircraft fuselage, as seen in an obliquely lateral direction from outside the aircraft. The illustrated cutout of the skin 112 has a door opening 102 which is equipped with a door arrangement 100 for optionally opening and pressure-tightly closing the door opening 102. The door arrangement 100 comprises a door frame 104 which is connected fixedly to the skin of the aircraft fuselage 112 and runs along the outer periphery of the door opening 102. Furthermore, the door arrangement 100 comprises a door 106 which corresponds in size and shape to the door opening 102 and, for the closing of the same, can be arranged in a form-fitting manner in the frame 104. To secure the door 106 in the position in which it closes the door opening 102, mechanical closure elements 124, such as locking bolts and the like, are provided in the door 106 and in the frame 104.

The door arrangement 100 is illustrated in FIG. 1 in an open state in which the door 106, which is suspended pivotably on the door frame 104 at hinges 118, has been unlocked and pivoted by means of the hinges 118 out of the door frame 104 such that it opens up the view through the door opening 102 into the interior of the aircraft fuselage.

On the inside of the door 106, which side faces the observer, an inner sealing lip 108 and an outer sealing lip 110 are fastened next to each other in a parallel route along the edge of the door 106. The edge region of the door 106, within which the sealing lips 108, 110 run, is overlapped, when the door is closed, by a mating surface of the door frame 104, which surface is parallel to the inner surface of the door 106 in the closed state. In this case, an inner stop 114 and an outer stop 116 are formed on the mating surface of the door frame 104 next to each other in a parallel route along the periphery of the door opening 102 in such a manner that their profile is overlapped by the respective profile of the inner sealing lip 108 and the outer sealing lip 110 when the door arrangement 100 is closed.

When the door arrangement 100 is locked in the closed state, the door 106 is pressed into the door frame 104 by the mechanical locking 124. In the process, the inner stop 114 is pressed into the inner sealing lip 108 which is correspondingly elastically deformed and forms a tight closure of the door opening 102 with the inner stop 114. At the same time, the outer stop 116 presses into the outer sealing lip 110 which is likewise elastically deformed and forms a further tight closure of the door opening 104 with the outer stop 116. In this manner, when the door arrangement 100 is closed, three regions which are separated from one another by sealing arise: the external atmosphere, the interior of the aircraft fuselage and an intermediate space of annular topology which is separated from the external atmosphere by the seal formed from the outer stop 116 with the outer sealing lip 110 and from the interior of the aircraft fuselage by the seal formed from the inner stop 114 and the inner sealing lip 108.

At a point on the mating surface of the door frame 104, a channel 120 which is connected on its rear side via a pipe 122 to an electric vacuum pump 126 is located in the region between the inner stop 114 and the outer stop 116.

During operation of the door arrangement 100, in order to close it, first of all the door 106 is pivoted by means of the hinges 118 into the door opening 102 such that the inner sealing lip 108 comes to lie opposite the inner stop 114 and the outer sealing lip 110 comes to lie opposite the outer stop 116. The door 106 is then pressed into the door frame 104 by actuation of the mechanical locking 124, with an intermediate space which is sealed off both from the external atmosphere and from the interior of the aircraft fuselage being produced by the seal produced between the inner stop 114 and the inner sealing lip 108 and between the outer stop 116 and the outer sealing lip 110. By actuation of the vacuum pump 126, air is now pumped out of the produced intermediate space via the pipe 122 and the channel 120, as a result of which the pressure in the intermediate space drops to a value which lies below the external atmospheric pressure and the pressure within the aircraft fuselage. The suction effect produced by said negative pressure causes the door 106 to be, as it were, drawn into the door frame 104 and therefore assists the force exerted by the press-on or securing device, such as, for example, the mechanical locking 124.

Figure 2:
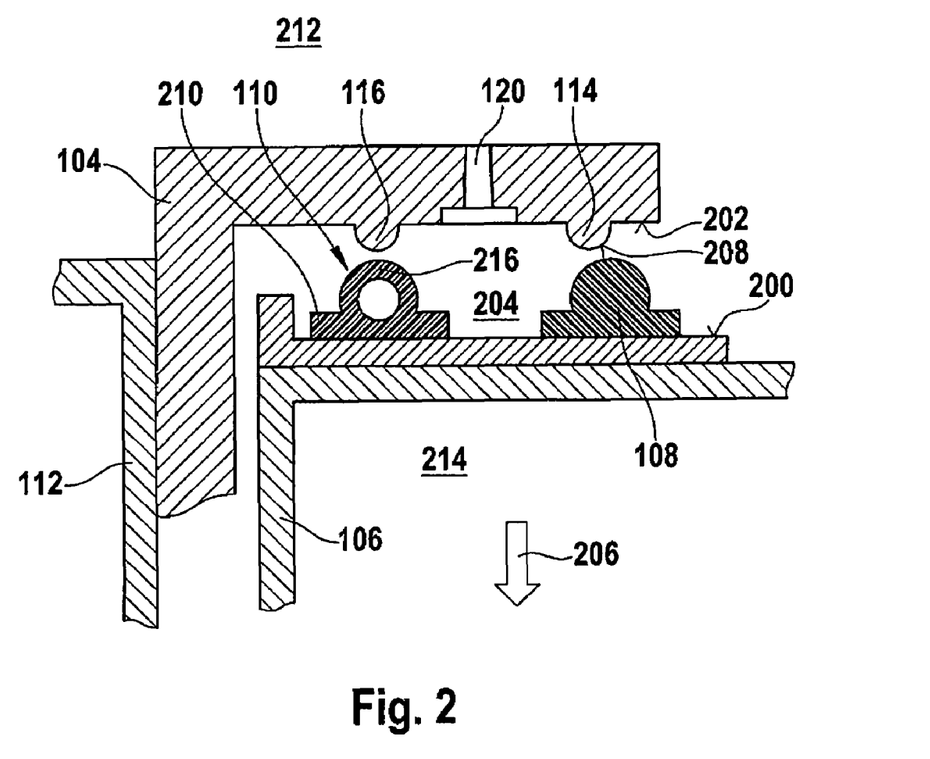
FIG. 2 is a sectional view of an edge region of the inside of the door arrangement from FIG. 1, in a closed state.
Figure 2A:
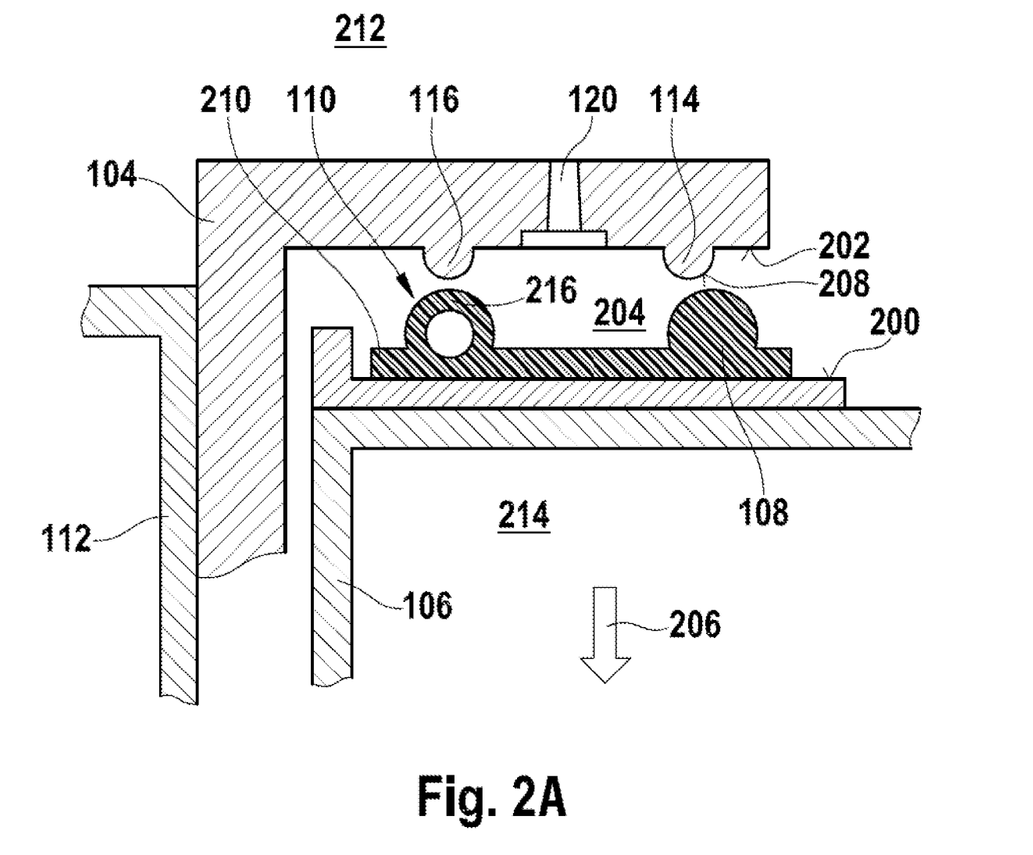
FIGS. 2A-C each are a sectional view of an edge region of the inside of a door arrangement of an aircraft fuselage.
Figure 2B:
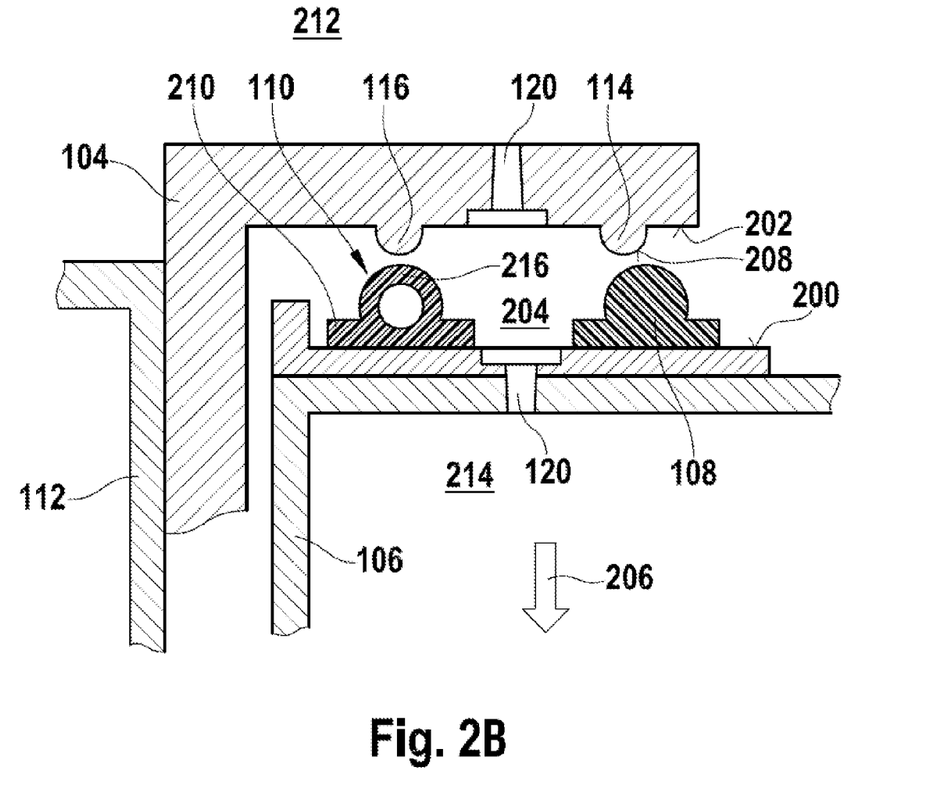
Figure 2C:
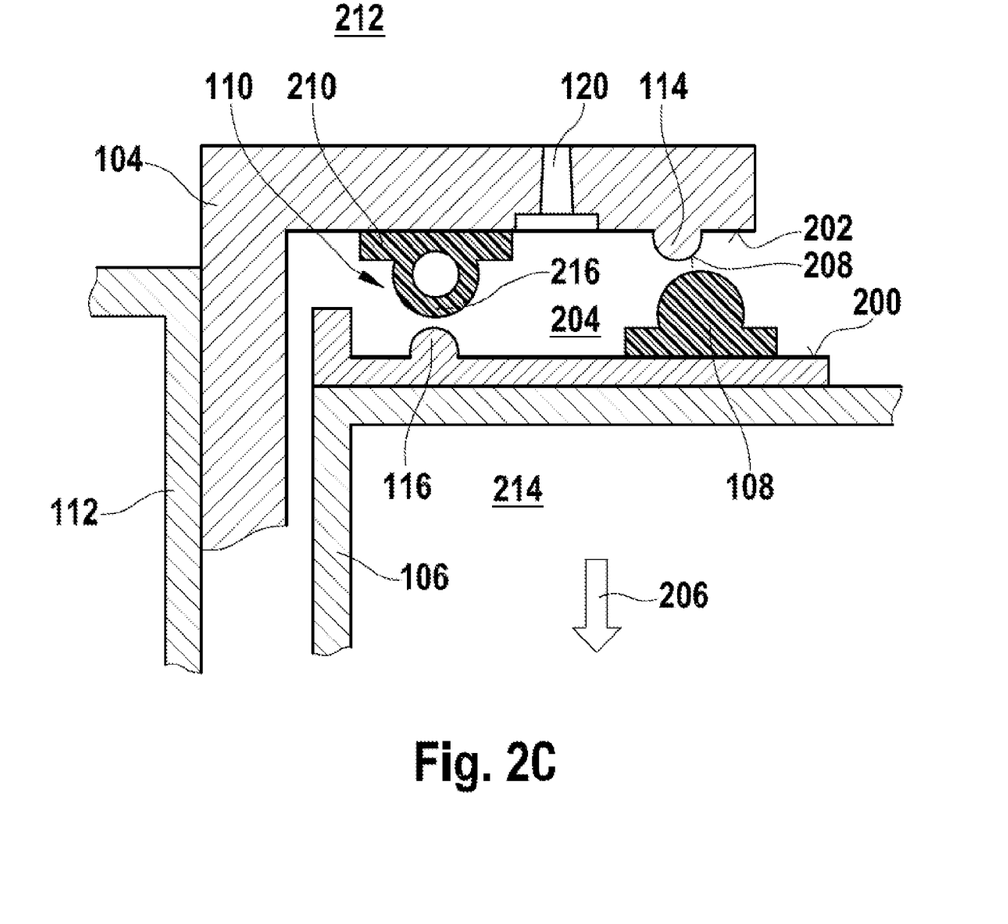

FIG. 2 shows a sectional view of an edge region of the inside of the door arrangement 100 from FIG. 1, with reference to which the manner of operation of the invention will be explained in more detail. The illustration corresponds to an incompletely closed position of the door arrangement, in which the door 106 has been pivoted into the door opening but has not yet been locked. For better orientation, the opening direction of the door 106, i.e. the direction pointing out of the aircraft fuselage to the outside, is marked by an arrow 206.

It can be seen in the upper and left part of the illustration that the door frame 104 has an angular profile, the limb of which, which runs parallel to the opening direction 206 of the door 106, is connected fixedly to the shell structure of the aircraft fuselage 112. That limb of the door frame 104 which runs perpendicularly to the opening direction 206 of the door 106 projects into the door opening and forms a mating surface 202 which lies opposite the inner surface 200 of the door 106 in the closed state of the door arrangement. The inner stop 114 and the outer stop are formed on the mating surface 202 as projections with a curved profile.

The outer sealing lip 110 is arranged, lying opposite the outer stop 116, on the inside 200 of the door 106 and is illustrated here by way of example as a hollow profile which is composed of a rubber-elastic material and has a foot 210. When the door 106 is pressed against the door frame 104, the sealing lip 110 is pressed by a wall section 216 facing the stop 116 against said door frame and the curved outer contour of the stop 116 is correspondingly deformed such that the outer periphery of the stop 116 is engaged around in a form-fitting manner by the sealing lip 110 and increases the sealing surface.

A different example of a sealing lip 108, 110 is the solid profile which is shown as the inner sealing lip 108 and is composed of a rubber-elastic material. The inner sealing lip 108 lies opposite the inner stop 114 but is displaced in relation to the latter in a direction pointing away from the centre of the intermediate space 204 located between the inner sealing lip 108 and outer sealing lip 110 such that, when the door 106 is fixed in the door frame 104 by the mechanical locking, the sealing lip 108 comes into contact with the stop 114 on a surface section which is inclined in relation to the mating surface 202 in a direction pointing away from the intermediate space 204.

To completely close the door arrangement, the door 106 is pressed into the door frame 104 counter to the arrow direction 206 by means of the mechanical locking, and therefore the sealing lips 108, 110 each come into contact with the stops 114, 116 lying opposite them and form between them an intermediate space 204 which is closed off from the inner region 212 and the outer region 214. To evacuate the intermediate space 204, a channel 120 which is connected to a vacuum pump, not shown here, is provided in the door frame 104.

The difference in pressure of the intermediate space from the inner region 212 and outer region 214 acts in the direction of a contraction of the intermediate space, thus giving rise to a suction effect which, firstly, leads to the door 106 and the frame 104 being pressed against each other and therefore to the sealing lips 108, 110 being reliably pressed over their entire length uniformly against the corresponding stops 114, 116. Secondly, the sealing lips 108, 110 are subjected directly by the suction action or the difference in pressure to an essentially lateral force which is directed into the interior of the intermediate space 204 and, in the case of an arrangement shown as for the inner sealing lip 108 and the inner stop 114, is used directly for increased pressing of the sealing lip 108 against a curved stop section 208 facing away from the intermediate space. Since the difference in pressure between inner region 212 and the evacuated intermediate space 204 remains essentially constant during the flight operation, and, by contrast, the difference in pressure between outer region 214 and the evacuated intermediate space 204 becomes smaller as the flight altitude increases, the sealing lips 108, 110 and associated stops 114, 116 are each designed differently and arranged with respect to each other in accordance with the demands imposed on them.

Although the present invention has been described in the present case with reference to preferred exemplary embodiments, it is not restricted to them but rather can be modified in diverse ways.

For example, the sealing lips and/or the stops can be fastened in a different manner. For example, the inner sealing lip can be fastened to the door, but the outer sealing lip can be fastened to the door frame.

The inner and outer stop can also be combined integrally in a single double stop, with the sealing lips each being pressed against a side surface of the double stop, which side surface is inclined away from the centre of the intermediate space. In this arrangement, the channel can be directed through the double stop.

In order to maintain a stable vacuum in the intermediate space, a pressure sensor and a regulator can be provided and, during the flight operation, switch on the vacuum pump if the pressure in the intermediate space has exceeded a certain value.

The vacuum pump can be designed such that it can be separated from the door arrangement, for example if the arrangement is used on door or cover arrangements of containers which do not have their own power supply.

Although modifications and changes may be suggested by those skilled in the art, it is the intention of the inventor to embody within the patent warranted hereon all changes and modifications as reasonably and properly come within the scope of his contribution to the art.

The invention claimed is:

1. An aircraft comprising a door opening and a door arrangement for tightly closing the door opening, the door opening comprising:
   a door frame;
   a door which, when closed, is arranged in the door frame;
   an inner sealing lip and an outer sealing lip running next to each other along a periphery of the door opening between a first surface of the door and a second surface of the door frame, the first and second surfaces facing each other, and the inner and outer sealing lips bounding a space formed between them;

a pressure-reducing device configured to reduce pressure in the space;

a pressure sensor for measuring the pressure in the space; and a regulator which switches on the pressure-reducing device when the pressure in the space exceeds a certain value during flight operation of the aircraft.

2. The aircraft of claim 1, wherein the door arrangement further comprises a press-on device configured to press the first surface of the door against the second surface of the door frame.

3. The aircraft of claim 1, wherein the pressure-reducing device comprises a vacuum pump which pumps air contained in the space out of the space.

4. The aircraft of claim 3, wherein the pressure-reducing device comprises at least one channel provided in the first surface of the door, at least one channel provided in the second surface of the door frame, or at least one channel provided in the first surface and at least one channel provided in the second surface; the channel being operatively coupled to the space and being utilized for pumping off the air by means of the vacuum pump.

5. The aircraft of claim 1, wherein at least one of the inner or outer sealing lips comprises at least one of
 a rubber material,
 a highly tear-resistant silicone rubber material,
 a hollow cross section, or
 a solid cross section.

6. The aircraft of claim 1, wherein the inner and outer sealing lips are connected integrally to each other.

7. The aircraft of claim 1, wherein the first surface of the door and the second surface of the door frame run essentially parallel and perpendicular to an opening direction of the door.

8. The aircraft of claim 1, wherein at least one sealing lip of the inner and outer sealing lips is attached to one of the first surface of the door and the second surface of the door frame, wherein a corresponding projecting stop, against which the at least one sealing lip is pressed when the door is closed, is formed opposite to the at least one sealing lip on the other one of the first surface of the door and the second surface of the door frame.

9. The aircraft of claim 8, wherein the at least one sealing lip is displaced, in relation to the corresponding projecting stop, in a direction pointing away from a centre of the space, such that when the door is closed, the at least one sealing lip comes into contact with the corresponding projecting stop on a surface section of the corresponding projecting stop, which surface section faces away from the space.

10. The aircraft of claim 1, further comprising
 a pressurized cabin; and
 an outer surface configured to separate the pressurized cabin from the outer atmosphere, the door arrangement being arranged within the outer surface.

11. The aircraft of claim 9, further comprising
 a pressurized cabin; and
 an outer surface configured to separate the pressurized cabin from the outer atmosphere, the door arrangement being arranged within the outer surface;
 wherein the at least one sealing lip is the inner sealing lip, the sealing lip and the corresponding projecting stop separating the space from the pressurized cabin when the door is closed.

\* \* \* \* \*